United States Patent
Lee

(10) Patent No.: US 11,290,037 B1
(45) Date of Patent: Mar. 29, 2022

(54) MOTOR CONTROLLER

(71) Applicant: Global Mixed-mode Technology Inc., Hsin-Chu (TW)

(72) Inventor: Rong-Chin Lee, Pingtung County (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 0 days.

(21) Appl. No.: 17/090,906

(22) Filed: Nov. 6, 2020

(51) Int. Cl.
*H02K 29/08* (2006.01)
*H02P 6/16* (2016.01)

(52) U.S. Cl.
CPC .............. *H02P 6/16* (2013.01); *H02K 29/08* (2013.01)

(58) Field of Classification Search
CPC .. H02P 6/16; H02P 6/20; H02P 29/024; H02P 29/028; H02P 6/12; H02P 29/0241; H02K 29/08
See application file for complete search history.

(56) References Cited

U.S. PATENT DOCUMENTS 9,577,566 B2   2/2017  Chen

FOREIGN PATENT DOCUMENTS

| CN | 101807873 A | | 8/2010 |
|---|---|---|---|
| CN | 112600476 A | * | 4/2021 |
| TW | 201218614 A1 | | 5/2012 |
| TW | I692195 B | | 4/2020 |
| WO | 2005/122387 A1 | | 12/2005 |

* cited by examiner

*Primary Examiner* — Karen Masih
(74) *Attorney, Agent, or Firm* — Winston Hsu

(57) ABSTRACT

A motor controller comprises a driving circuit, a selection circuit, a sensorless control circuit, a Hall signal control circuit, a detection circuit, a first input terminal, and a second input terminal. The Hall signal control circuit may be coupled to a Hall sensor via the first input terminal and the second input terminal. When each of the voltage of the first input terminal and the voltage of the second input terminal is at a low level, the motor controller is operated in a sensorless driving mode. When one of the voltage of the first input terminal and the voltage of the second input terminal is at a high level, the motor controller is operated in a Hall control driving mode.

11 Claims, 5 Drawing Sheets

MOTOR CONTROLLER

BACKGROUND OF THE INVENTION

1. Field of the Invention

The present invention relates to a motor controller, and more particularly, to a motor controller which is capable of automatically detecting whether there exists a Hall sensor or not, so as to select a sensorless driving mode or a Hall control driving mode.

2. Description of the Prior Art

Conventionally, there are two driving methods for driving a motor. The first driving method uses the Hall sensor for switching phases, so as to drive the motor. The second driving method does not use the Hall sensor to drive the motor. FIG. 1 is a circuit diagram showing a conventional motor controller 10. The motor controller 10 comprises a driving circuit 100, a selection circuit 110, a sensorless control circuit 120, and a Hall signal control circuit 130. The driving circuit 100 generates an output signal OUT to drive a motor M. The selection circuit 110 is configured to determine to use the sensorless control circuit 120 or the Hall signal control circuit 130 to drive the motor M based on a mode selection signal MODE. However, the prior-art method needs to add an additional pin and thus it is inconvenient to use.

SUMMARY OF THE INVENTION

According to one embodiment of the present invention, a motor controller is capable of automatically detecting whether there exists a Hall sensor or not, so as to select a sensorless driving mode or a Hall control driving mode. The motor controller does not need to add an addition pin and thus the cost of the motor controller can be reduced. The motor controller is used for driving a motor. The motor controller comprises a driving circuit, a selection circuit, a sensorless control circuit, a Hall signal control circuit, a detection circuit, a first input terminal, and a second input terminal. The driving circuit generates an output signal for driving the motor. The sensorless control circuit receives the output signal, so as to sense the phase of the output signal and generate a sensorless control signal to the selection circuit for switching phases. The first input terminal is coupled to the Hall signal control circuit and the detection circuit. The second input terminal is coupled to the Hall signal control circuit and the detection circuit. Furthermore, the Hall signal control circuit may be coupled to a Hall sensor via the first input terminal and the second input terminal. Also, the detection circuit may be coupled to the Hall sensor via the first input terminal and the second input terminal. The Hall sensor may be used for sensing the variation of the magnetic field when the motor rotates, so as to generate a first Hall signal and a second Hall signal for switching phases. The Hall signal control circuit may receive the first Hall signal and the second Hall signal via the first input terminal and the second input terminal, so as to generate a Hall control signal to the selection circuit. The detection circuit generates a selection signal to the selection circuit by detecting the voltage of the first input terminal and the voltage of the second input terminal. The selection circuit generates a driving signal to the driving circuit based on the selection signal, so as to determine whether the motor controller is operated in the sensorless driving mode or the Hall control driving mode.

The motor controller can be applied to a single-phase or polyphase configuration. When the Hall sensor is not coupled to the motor controller, the motor controller is operated in the sensorless driving mode. When the Hall sensor is coupled to the motor controller via the first input terminal and the second input terminal, the motor controller is operated in the Hall control driving mode.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
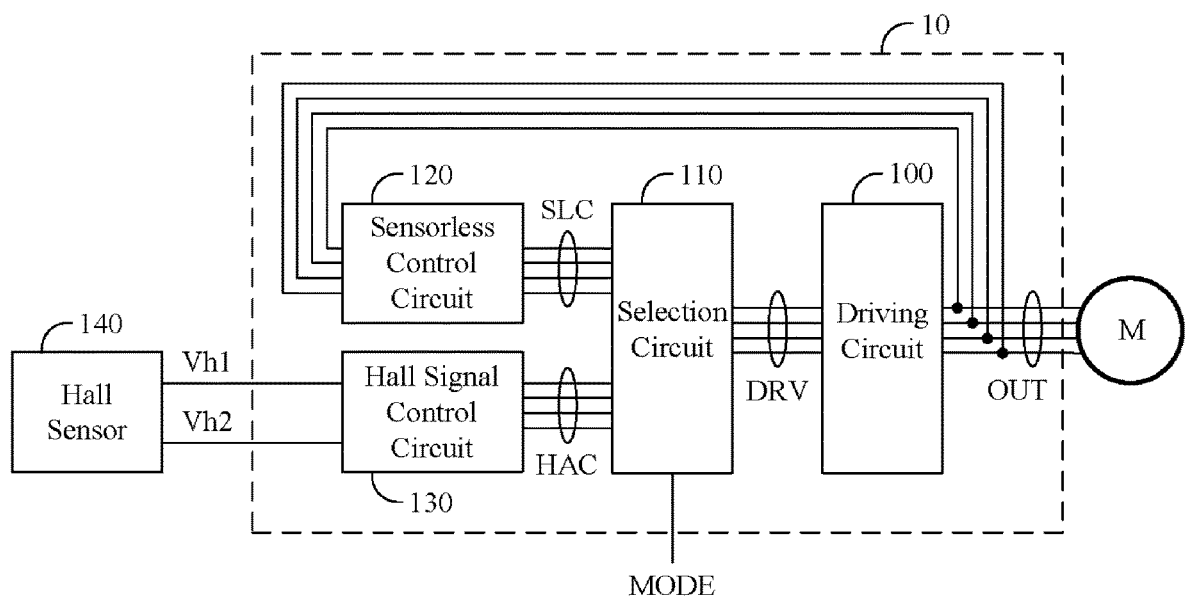
FIG. 1 is a circuit diagram showing a conventional motor controller.
Figure 2:
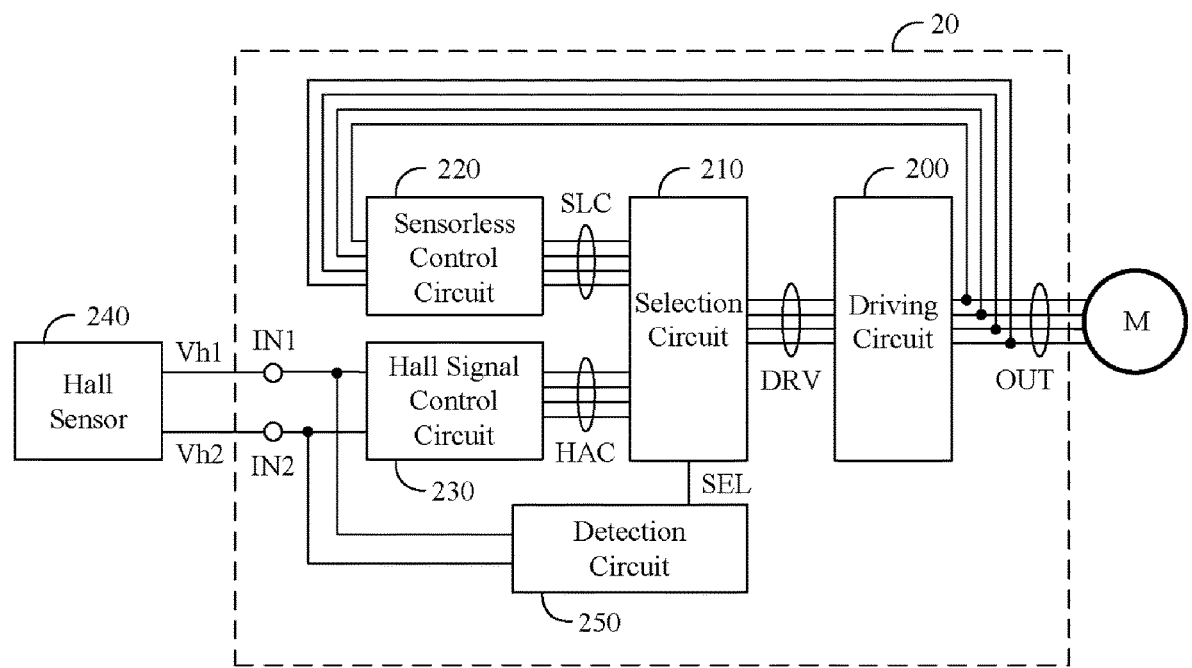
FIG. 2 is a circuit diagram showing a motor controller according to one embodiment of the present invention.

FIG. 2 is a circuit diagram showing a motor controller 20 according to one embodiment of the present invention. The motor controller 20 is used for driving a motor M. The motor controller 20 comprises a driving circuit 200, a selection circuit 210, a sensorless control circuit 220, a Hall signal control circuit 230, a detection circuit 250, a first input terminal IN1, and a second input terminal IN2. The driving circuit 200 generates an output signal OUT for driving the motor M. The sensorless control circuit 220 receives the output signal OUT, so as to sense the phase of the output signal OUT and generate a sensorless control signal SLC to the selection circuit 210 for switching phases. The first input terminal IN1 is coupled to the Hall signal control circuit 230 and the detection circuit 250. The second input terminal IN2 is coupled to the Hall signal control circuit 230 and the detection circuit 250. Furthermore, the Hall signal control circuit 230 may be coupled to a Hall sensor 240 via the first input terminal IN1 and the second input terminal IN2. Also, the detection circuit 250 may be coupled to the Hall sensor 240 via the first input terminal IN1 and the second input terminal IN2. The Hall sensor 240 may be used for sensing the variation of the magnetic field when the motor M rotates, so as to generate a first Hall signal Vhf and a second Hall signal Vh2 for switching phases. The Hall signal control circuit 230 may receive the first Hall signal Vh1 and the second Hall signal Vh2 via the first input terminal IN1 and the second input terminal IN2, so as to generate a Hall control signal HAC to the selection circuit 210. The detection circuit 250 generates a selection signal SEL to the selection circuit 210 by detecting the voltage of the first input terminal IN1 and the voltage of the second input terminal IN2. The selection circuit 210 generates a driving signal DRV to the driving circuit 200 based on the selection signal SEL, so as to determine whether the motor controller 20 is operated in a sensorless driving mode or a Hall control driving mode.

Figure 3A:
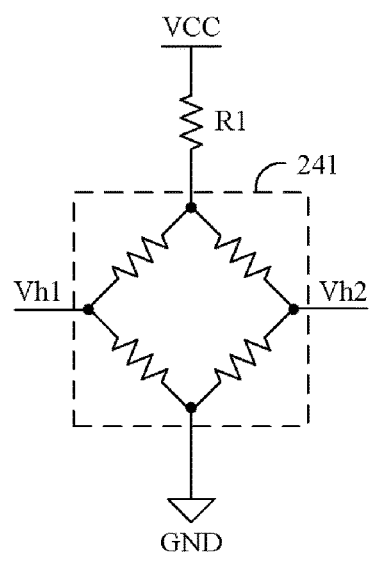
FIG. 3A is a circuit diagram showing a Hall sensor according to a first embodiment of the present invention.
Figure 3B:
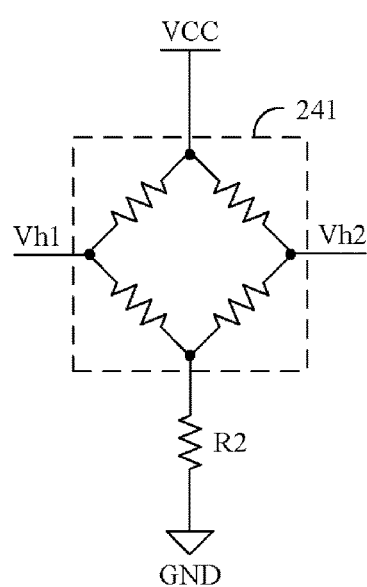
FIG. 3B is a circuit diagram showing the Hall sensor according to a second embodiment of the present invention.
Figure 3C:
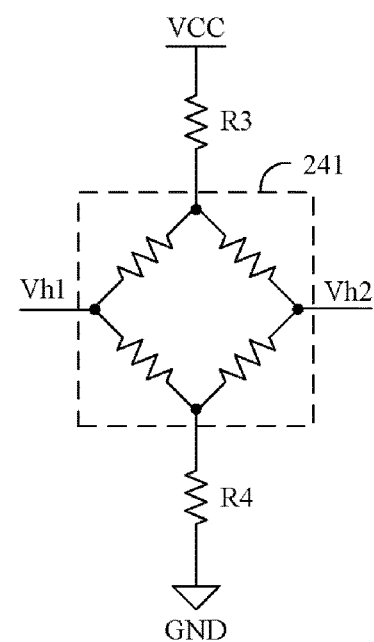
FIG. 3C is a circuit diagram showing the Hall sensor according to a third embodiment of the present invention.

The Hall sensor 240 which can be applied to the present invention may have at least three different kinds of variations. FIG. 3A is a circuit diagram showing the Hall sensor 240 according to a first embodiment of the present invention. The Hall sensor 240 may comprise a first resistor R1 and a Hall element 241 for generating the first Hall signal Vh1 and the second Hall signal Vh2. The first resistor R1 is coupled to the Hall element 241 and a voltage source VCC. One terminal of the Hall element 241 is coupled to a ground GND. FIG. 3B is a circuit diagram showing the Hall sensor 240 according to a second embodiment of the present invention. The Hall sensor 240 may comprise a second resistor R2 and the Hall element 241 for generating the first Hall signal Vh1 and the second Hall signal Vh2. One terminal of the Hall element 241 is coupled to the voltage source VCC. The second resistor R2 is coupled to the Hall element 241 and the ground GND. FIG. 3C is a circuit diagram showing the Hall sensor 240 according to a third embodiment of the present invention. The Hall sensor 240 may comprise a third resistor R3, a fourth resistor R4, and the Hall element 241 for generating the first Hall signal Vh1 and the second Hall signal Vh2. The third resistor R3 is coupled to the Hall element 241 and the voltage source VCC. The fourth resistor R4 is coupled to the Hall element 241 and the ground GND.

Figure 4:
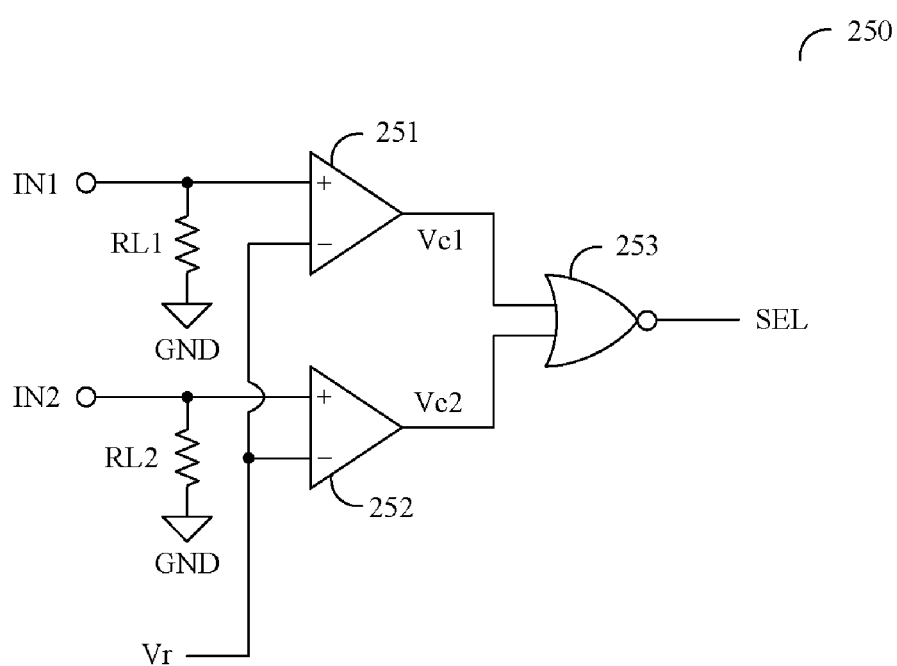
FIG. 4 is a circuit diagram showing a detection circuit according to a fourth embodiment of the present invention.

More specifically, the motor controller 20 may determine to operate in the sensorless driving mode or the Hall control driving mode based on the voltage of the first input terminal IN1 and the voltage of the second input terminal IN2. FIG. 4 is a circuit diagram showing the detection circuit 250 according to a fourth embodiment of the present invention. The detection circuit 250 may comprise a first load resistor RL1, a second load resistor RL2, a first comparator 251, a second comparator 252, and a NOR gate 253. The first load resistor RL1 is coupled to one positive input terminal of the first comparator 251 and the ground GND. The second load resistor RL2 is coupled to one positive input terminal of the second comparator 252 and the ground GND. The first comparator 251 receives the voltage of the first input terminal IN1 and a reference voltage Vr for generating a first control signal Vc1 to the NOR gate 253. The second comparator 252 receives the voltage of the second input terminal IN2 and the reference voltage Vr for generating a second control signal Vc2 to the NOR gate 253. The reference voltage Vr is less than the normal operating voltage of the Hall sensor 240. The NOR gate 253 receives the first control signal Vc1 and the second control signal Vc2 for generating the selection signal SEL to the selection circuit 210. Therefore, when the Hall sensor 240 is not coupled to the motor controller 20, the voltage of the first input terminal IN1 is less than the reference voltage Vr and the voltage of the second input terminal IN2 is less than the reference voltage Vr, such that the selection signal SEL is at a high level. When the selection signal SEL is at the high level, the selection circuit 210 drives the motor M based on the sensorless control signal SLC, such that the motor controller 20 is operated in the sensorless driving mode. On the contrary, when the Hall sensor 240 is coupled to the motor controller 20 via the first input terminal IN1 and the second input terminal IN2, the voltage of the first input terminal IN1 is greater than the reference voltage Vr and the voltage of the second input terminal IN2 is greater than the reference voltage Vr, such that the selection signal SEL is at a low level. When the selection signal SEL is at the low level, the selection circuit 210 drives the motor M based on the Hall control signal HAC, such that the motor controller 20 is operated in the Hall control driving mode. In other words, when each of the voltage of the first input terminal IN1 and the voltage of the second input terminal IN2 is at the low level, the motor controller 20 is operated in the sensorless driving mode. When one of the voltage of the first input terminal IN1 and the voltage of the second input terminal IN2 is at the high level, the motor controller 20 is operated in the Hall control driving mode.

Figure 5:
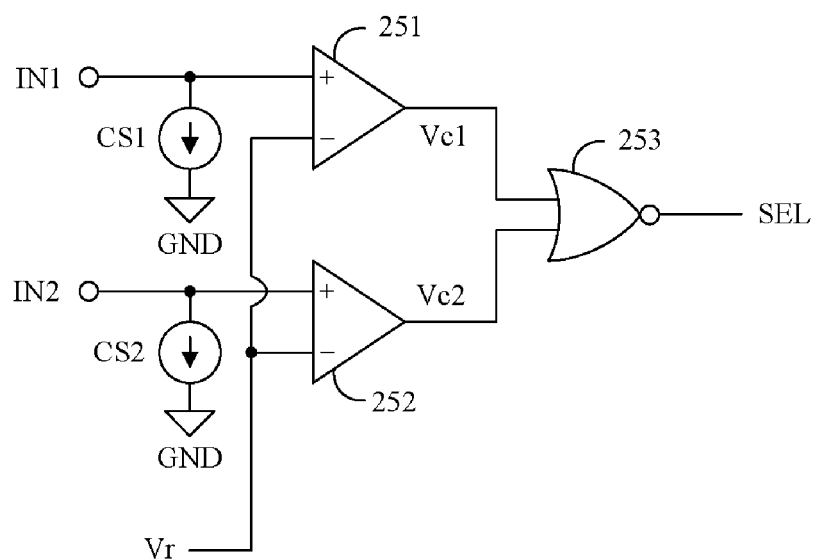
FIG. 5 is a circuit diagram showing the detection circuit according to a fifth embodiment of the present invention.

FIG. 5 is a circuit diagram showing the detection circuit 250 according to a fifth embodiment of the present invention. The detection circuit 250 may comprise a first current source CS1, a second current source CS2, the first comparator 251, the second comparator 252, and the NOR gate 253. The first current source CS1 is coupled to the positive input terminal of the first comparator 251 and the ground GND. The second current source CS2 is coupled to the positive input terminal of the second comparator 252 and the ground GND. The first comparator 251 receives the voltage of the first input terminal IN1 and the reference voltage Vr for generating the first control signal Vc1 to the NOR gate 253. The second comparator 252 receives the voltage of the second input terminal IN2 and the reference voltage Vr for generating the second control signal Vc2 to the NOR gate 253. The NOR gate 253 receives the first control signal Vc1 and the second control signal Vc2 for generating the selection signal SEL to the selection circuit 210. Therefore, when the Hall sensor 240 is not coupled to the motor controller 20, the voltage of the first input terminal IN1 is less than the reference voltage Vr and the voltage of the second input terminal IN2 is less than the reference voltage Vr, such that the selection signal SEL is at the high level. When the selection signal SEL is at the high level, the selection circuit 210 drives the motor M based on the sensorless control signal SLC, such that the motor controller 20 is operated in the sensorless driving mode. On the contrary, when the Hall sensor 240 is coupled to the motor controller 20 via the first input terminal IN1 and the second input terminal IN2, the voltage of the first input terminal IN1 is greater than the reference voltage Vr and the voltage of the second input terminal IN2 is greater than the reference voltage Vr, such that the selection signal SEL is at the low level. When the selection signal SEL is at the low level, the selection circuit 210 drives the motor M based on the Hall control signal HAC, such that the motor controller 20 is operated in the Hall control driving mode. In other words, when each of the voltage of the first input terminal IN1 and the voltage of the second input terminal IN2 is at the low level, the motor controller 20 is operated in the sensorless driving mode. When one of the voltage of the first input terminal IN1 and the voltage of the second input terminal IN2 is at the high level, the motor controller 20 is operated in the Hall control driving mode.

According to one embodiment of the present invention, the motor controller can be applied to a single-phase or polyphase configuration. When the Hall sensor 240 is not coupled to the motor controller 20, the motor controller 20 is operated in the sensorless driving mode. When the Hall sensor 240 is coupled to the motor controller 20 via the first input terminal IN1 and the second input terminal IN2, the motor controller 20 is operated in the Hall control driving mode. The motor controller 20 does not need to add an addition pin and thus the cost of the motor controller 20 can be reduced.

While the present invention has been described by the preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor controller configured to drive a motor, the motor controller comprising:
    a first input terminal;
    a second input terminal;
    a driving circuit, configured to generate an output signal to drive the motor;
    a selection circuit;
    a sensorless control circuit, configured to receive the output signal for generating a sensorless control signal to the selection circuit;
    a Hall signal control circuit, coupled to the first input terminal and the second input terminal for generating a Hall control signal to the selection circuit; and
    a detection circuit, configured to detect a voltage of the first input terminal and a voltage of the second input terminal for generating a selection signal to the selection circuit, wherein when each of the voltage of the first input terminal and the voltage of the second input terminal is at a low level, the motor controller is operated in a sensorless driving mode, when a Hall sensor is coupled to the motor controller via the first input terminal and the second input terminal, the motor controller is operated in a Hall control driving mode, and the Hall sensor comprises a Hall element coupled to a ground and a first resistor coupled to the Hall element and a voltage source.

2. A motor controller configured to drive a motor, the motor controller comprising:
    a first input terminal;
    a second input terminal;
    a driving circuit, configured to generate an output signal to drive the motor;
    a selection circuit;
    a sensorless control circuit, configured to receive the output signal for generating a sensorless control signal to the selection circuit;
    a Hall signal control circuit, coupled to the first input terminal and the second input terminal for generating a Hall control signal to the selection circuit; and
    a detection circuit, configured to detect a voltage of the first input terminal and a voltage of the second input terminal for generating a selection signal to the selection circuit, wherein when each of the voltage of the first input terminal and the voltage of the second input terminal is at a low level, the motor controller is operated in a sensorless driving mode, when a Hall sensor is coupled to the motor controller via the first input terminal and the second input terminal, the motor controller is operated in a Hall control driving mode, and the Hall sensor comprises a Hall element coupled to a voltage source and a second resistor coupled to the Hall element and a ground.

3. A motor controller configured to drive a motor, the motor controller comprising:
    a first input terminal;
    a second input terminal;
    a driving circuit, configured to generate an output signal to drive the motor;
    a selection circuit;
    a sensorless control circuit, configured to receive the output signal for generating a sensorless control signal to the selection circuit;
    a Hall signal control circuit, coupled to the first input terminal and the second input terminal for generating a Hall control signal to the selection circuit; and
    a detection circuit, configured to detect a voltage of the first input terminal and a voltage of the second input terminal for generating a selection signal to the selection circuit, wherein when each of the voltage of the first input terminal and the voltage of the second input terminal is at a low level, the motor controller is operated in a sensorless driving mode, when a Hall sensor is coupled to the motor controller via the first input terminal and the second input terminal, the motor controller is operated in a Hall control driving mode, and the Hall sensor comprises a Hall element, a third resistor coupled to the Hall element and a voltage source, and a fourth resistor coupled to the Hall element and a ground.

4. A motor controller configured to drive a motor, the motor controller comprising:
    a first input terminal;
    a second input terminal;
    a driving circuit, configured to generate an output signal to drive the motor;
    a selection circuit;
    a sensorless control circuit, configured to receive the output signal for generating a sensorless control signal to the selection circuit;
    a Hall signal control circuit, coupled to the first input terminal and the second input terminal for generating a Hall control signal to the selection circuit; and
    a detection circuit, configured to detect a voltage of the first input terminal and a voltage of the second input terminal for generating a selection signal to the selection circuit, wherein when each of the voltage of the first input terminal and the voltage of the second input terminal is at a low level, the motor controller is operated in a sensorless driving mode, when a Hall sensor is coupled to the motor controller via the first input terminal and the second input terminal, the motor controller is operated in a Hall control driving mode, the detection circuit comprises a first load resistor, and the first load resistor is coupled to the first input terminal.

5. The motor controller of claim 4, wherein the detection circuit further comprises a second load resistor, and the second load resistor is coupled to the second input terminal.

6. The motor controller of claim 5, wherein the detection circuit further comprises:
    a NOR gate, configured to generate the selection signal;
    a first comparator, configured to receive the voltage of the first input terminal and a reference voltage for generating a first control signal to the NOR gate; and a second comparator, configured to receive the voltage of the second input terminal and the reference voltage for generating a second control signal to the NOR gate.

7. The motor controller of claim 6, wherein the reference voltage is less than a normal operating voltage of the Hall sensor.

8. A motor controller configured to drive a motor, the motor controller comprising:
- a first input terminal;
- a second input terminal;
- a driving circuit, configured to generate an output signal to drive the motor;
- a selection circuit;
- a sensorless control circuit, configured to receive the output signal for generating a sensorless control signal to the selection circuit;
- a Hall signal control circuit, coupled to the first input terminal and the second input terminal for generating a Hall control signal to the selection circuit; and
- a detection circuit, configured to detect a voltage of the first input terminal and a voltage of the second input terminal for generating a selection signal to the selection circuit, wherein when each of the voltage of the first input terminal and the voltage of the second input terminal is at a low level, the motor controller is operated in a sensorless driving mode, when a Hall sensor is coupled to the motor controller via the first input terminal and the second input terminal, the motor controller is operated in a Hall control driving mode, the detection circuit comprises a first current source, and the first current source is coupled to the first input terminal.

9. The motor controller of claim 8, wherein the detection circuit further comprises a second current source, and the second current source is coupled to the second input terminal.

10. The motor controller of claim 9, wherein the detection circuit further comprises:
- a NOR gate, configured to generate the selection signal;
- a first comparator, configured to receive the voltage of the first input terminal and a reference voltage for generating a first control signal to the NOR gate; and
- a second comparator, configured to receive the voltage of the second input terminal and the reference voltage for generating a second control signal to the NOR gate.

11. The motor controller of claim 10, wherein the reference voltage is less than a normal operating voltage of the Hall sensor.

\* \* \* \* \*